Feb. 1, 1938. C. C. WHITTIER 2,106,781
APPARATUS FOR PRODUCING ANTIRACHITIC PRODUCTS
Filed July 5, 1935
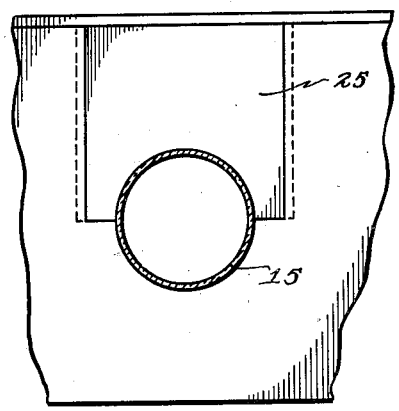
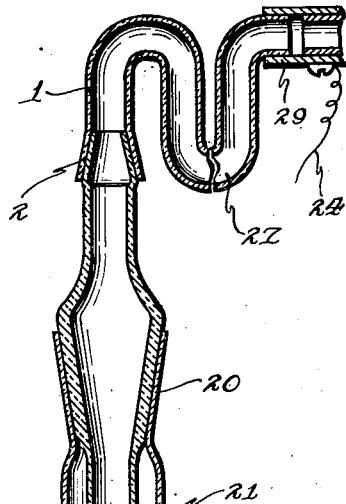
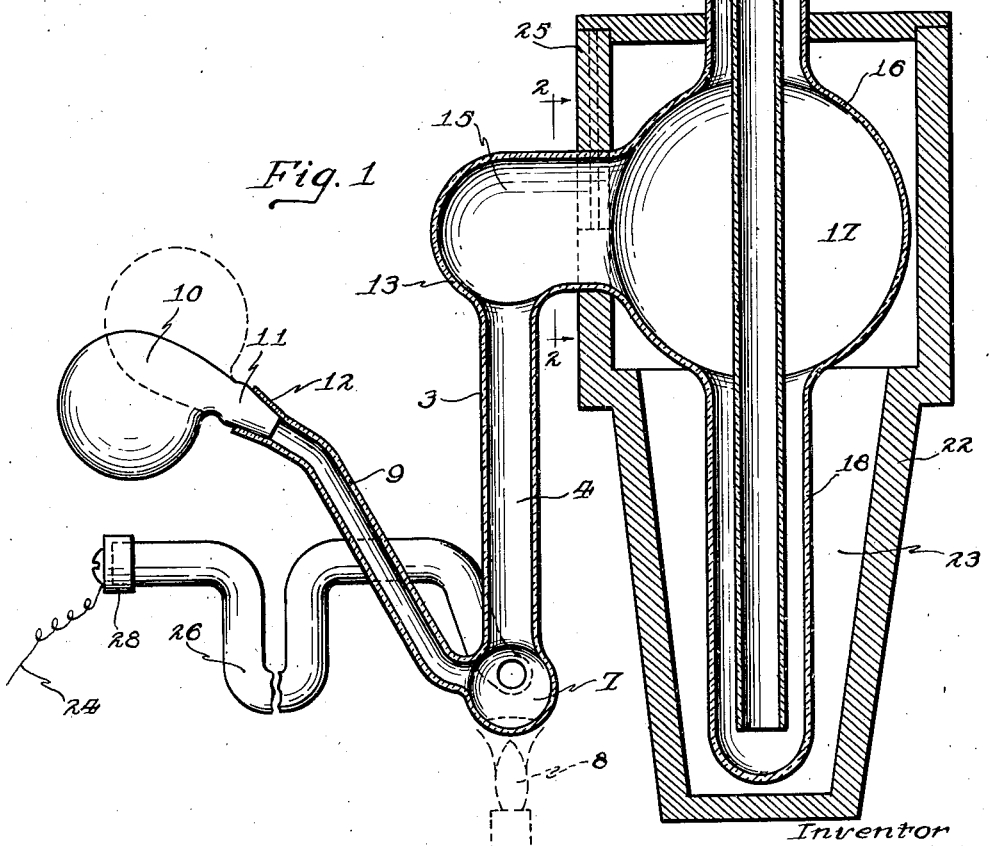
Inventor
Charles C. Whittier
Rummler Rummler & Woodworth,
Att'ys.

Patented Feb. 1, 1938

2,106,781

UNITED STATES PATENT OFFICE 2,106,781

APPARATUS FOR PRODUCING ANTIRACHITIC PRODUCTS

Charles C. Whittier, Chicago, Ill., assignor to Nutrition Research Laboratories, Inc., Chicago, Ill., a corporation of Delaware Application July 5, 1935, Serial No. 29,881

2 Claims. (Cl. 204—31)

This invention relates to method and apparatus for antirachitically activating ergosterol and related substances in the commercial production of vitamin D.

The main objects of this invention are to provide an improved form of apparatus of the type described in my co-pending application for Letters Patent, Serial No. 711,539, filed February 16, 1934, with particular reference to structural improvements for manufacturing antirachitic products on a commercial scale; without exposing either the raw material or finished product to contact with or proximity to a charged electrode, and to carry out the process at such low vacuum that the flow of current will be silent.

Certain structural features, shown but not claimed herein, are claimed in my co-pending application Serial No. 29,882 filed of even date herewith.

A specific embodiment of this invention is illustrated in the accompanying drawing in which:

Figure 1 is a vertical section of the complete apparatus, the vacuum pump and source of electric current being indicated by their connection fittings and line wires respectively.

Fig. 2 is a transverse section taken on the line 2—2 of Fig. 1 and showing a detail of the gate in the condenser housing to permit easy removal of the tube.

In the form shown in the drawing, the apparatus comprises a vacuum tube preferably formed of glass or other dielectric material and made up of a plurality of communicating sections or chambers in all of which a vacuum is maintained by means of a vacuum pump which may be of any suitable commercial form and is accordingly represented in the drawing by one of its connecting fittings 1 with which the main tube is connected as for example, by the conically ground joint 2.

The processing tube comprises an upright portion 3 which forms the treatment chamber 4. Below the treatment chamber 4 is a bulbous vaporizing chamber or flask 7. Appropriate heating means indicated as the flame from a burner 8 is provided for vaporizing the contents of flask 7.

An inclined inlet duct 9 extends upwardly from flask 7 at one side of the tube 3 and has air-tight connection with a supply receptacle 10. The receptacle 10 is preferably of globular or spherical form with a tangentially arranged throat 11 connected to the tube 9. A conically ground slip joint 12, as indicated in Fig. 1, forms an appropriate connection which, when appropriately lubricated, allows the receptacle 10 to be rotated on the joint 12 to control the rate at which the raw material, usually ergosterol, is fed to the flask 7.

The upper end of the tubular portion 3 is enlarged to form a bulb 13. The bulb 13 has a somewhat enlarged tubular branch 15 which connects with larger globular member 16 which, together with a depending branch 18 forms an expansion and condensing chamber 17. The vacuum pump communicates with the interior of the condenser 17 through a tube 19 which extends down to the lower portion of the branch 18 and has tapered and ground slip joints at 2 and 20 where it connects with the fitting 1 and the outlet throat 21 of the condenser chamber.

The condenser 17 is surrounded by a jacket or housing 22 which supports a suitable refrigerant, such for example, as solid carbondioxide or dry ice filling the space 23, and in contact with the walls of the chamber 17.

The electrical leads 24 are connected with a source of electric current which may be either direct or alternating. In practice, I use alternating current of 20,000 volts and 10 milliampers obtained from the secondary circuit of a transformer whose primary on commercial circuit of 110 volts, 60 cycles, has a consumption rate of 200 v. a.

I am aware that good results can be obtained with a wide range of current strength and have used in the commercial production of vitamin D, voltages of 20,000 to 100,000 and frequencies of 60 cycles to 13 kilocycles.

I have specified herein certain electrical current characteristics that I have used extensively in the commercial production of antirachitic products, that measure up to the most exacting tests of potency, including American Pharmacopoeia standards, and the international standards established by the League of Nations and defined in its publication Official No. C. H. 1056 (1) Geneva, 1931 (London June 23, 1931) and in no instance has the product exhibited any of the undesirable characteristics, such as tachosterol, toxisterol and others, that have been ascribed to overexposure of ergosterol or alimentary products to ultra-violet light. The low vacuum of one-half millimeter to one millimeter of mercury head that I maintain in order to control the flow of vaporized ergosterol at the desired rate, at the voltages specified, and the absence of any metallic gas in the system, preclude the production of any ultra-violet light in my process. Furthermore, I have provided tortuous branch connections 26 and 27 to the opposite ends of my treatment chamber 4 and placed the electric terminals 28 and 29 so as to be exposed to the contents of the tube but in remote positions in these branches so that by no chance can straight line discharges at these terminals reach the zone occupied by the vapors being treated. The activating electrical influence is a silent discharge or flow of electricity of which the ergosterol vapor is the conducting medium.

In operation, after the device is set up as shown in Fig. 1, the vacuum pump is operated to maintain a vacuum equivalent to one-half to one millimeter of mercury column which is maintained by continuous operation of the vacuum pump throughout the process.

A supply of the raw material to be treated, usually ergosterol, is placed in the receptacle 10 and after the desired vacuum is attained, the receptacle 10 is gradually rotated to discharge a fine stream of the powdered ergosterol through the inlet tube 9 to the flask 7 where it is vaporized by the heat of the burner 8 whose flame is played upon the walls of the flask 7 in such a way as to avoid excessive heating and maintain a uniform rate of evaporation of the ergosterol.

The vapor of ergosterol rises through the chamber 4 where it is subjected to the electrical influence produced by the current from the leads 24. The expression "electrical influence" is intended to describe any and all electrical conditions that are responsible for the antirachitic activation of the vapor as it traverses the space 4.

The term ergosterol is intended to include ergosterol per se, as well as substances related to it, such as lipins, sterols, cholesterol, zoosterol and the like.

The branch 18 and exhaust tube 19 are extended to sufficient length to avoid any escape of the substance treated into the exhaust piping or pump. The finished product may be removed from the condenser by scraping or brushing it off from the condenser walls or by dissolving it in ether.

Although but one specific embodiment of this invention is herein shown and described, it is to be understood that details as set forth may be altered or omitted without departing from the spirit of the invention as defined by the following claims.

I claim:

1. In apparatus for antirachitic activation of alimentary substances, a vacuum tube having means to maintain a vacuum therein, a supply chamber, a vaporizing chamber, a treatment chamber, a condensing chamber communicating with each other, said tube having branches in communication with opposite ends respectively of said treatment chamber and a source of electric current having terminals exposed to the contents of said tube for causing an electric current to flow through the vapor in said treatment chamber, said terminals being each located in said branches remote from said treatment chamber, and in such disposition as to exclude straight line discharges from one terminal to the other.

2. In apparatus for antirachitic activation of alimentary substances, a vacuum tube having means to maintain a vacuum therein, a supply chamber, a vaporizing chamber, a treatment chamber, and a condensing chamber communicating with each other, said tube having tortuous branches in communication with opposite ends respectively of said treatment chamber, and a source of electric current having terminals for causing an electric current to flow through the vapor in said treatment chamber, said terminals being exposed to the contents of said tube and each located respectively in said branches remote from said treatment chamber.

CHARLES C. WHITTIER.